3,440,688
APPARATUS FOR PRODUCING CONTINUOUSLY COMBED SLIVER FROM CARDED SLIVER
Naonari Yamamoto, Takatsuki-shi, Osaka-fu, Mitsuo Masuda, Ibaragi-shi, Osaka-fu, and Toshihiko Saikawa, Akira Tsubota, and Yasuo Shida, Takatsuki-shi, Osaka-fu, and Toshiji, Matsumura, Toyonaka-shi, Osaka-fu, Japan, assignors, by mesne assignments, to Toyo Boseki Kabushiki Kaisha, Osaka, Japan, a corporation of Japan
Continuation-in-part of application Ser. No. 298,828, July 31, 1963. This application Feb. 24, 1966, Ser. No. 529,704
Claims priority, application Japan, Aug. 22, 1962, 37/34,841; Sept. 25, 1962, 37/55,074; Oct. 12, 1962, 37/44,104; Oct. 24, 1962, 37/46,366; Dec. 10, 1962, 37/54,382
Int. Cl. D01b *3/04;* D01g *19/00;* D01h *5/00*
U.S. Cl. 19—65                                      2 Claims

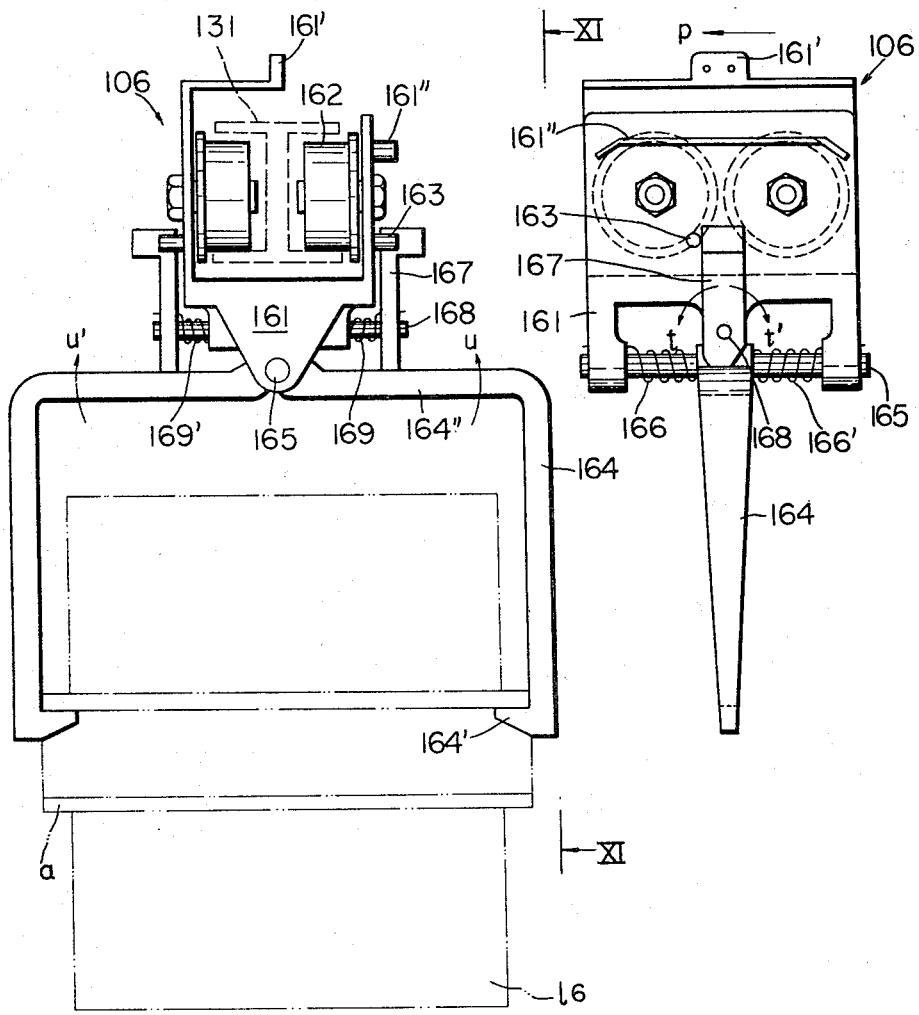

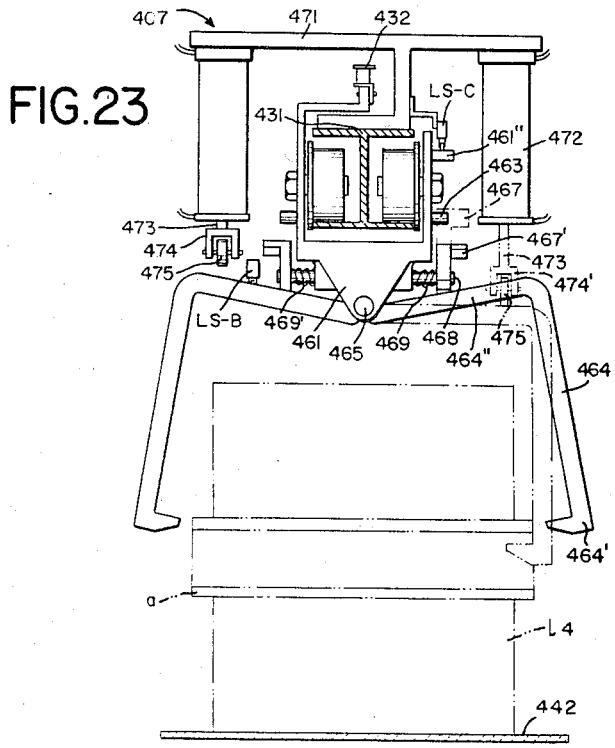
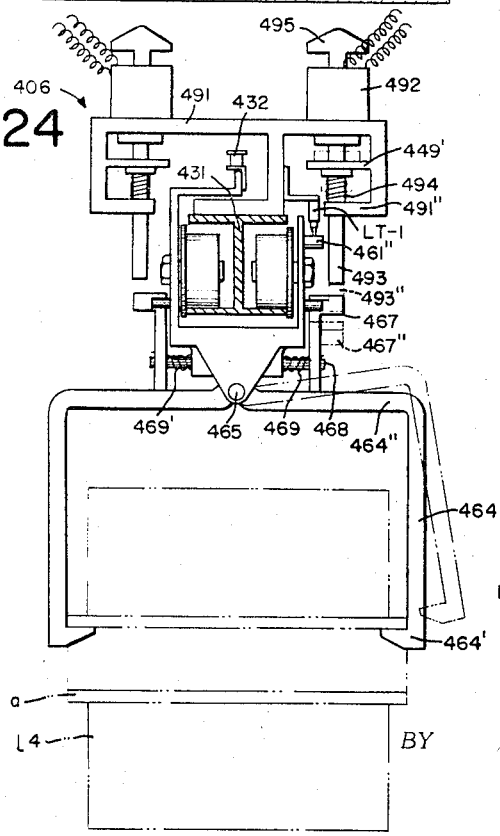

ABSTRACT OF THE DISCLOSURE

This invention provides a method and apparatus adapted to perform an integrated and continuous series of steps in processing fibers from a carding step to a combing step including forming a comber lap by doubling slivers, drawing relatively heavy slivers from a carding machine and taking the slivers up on a bobbin, automatically doffing the wound comber lap on to a receiver and automatically removing the lap to a comber machine by an overhead carrier, doubling the fleeces of the comber laps, drafting and combing these fleeces and collecting and drawing relatively even slivers into a single combed sliver.

---

This invention relates to a process and an apparatus for continuously producing combed sliver from carded sliver.

This application is a continuation-in-part of our application Ser. No. 298,828 filed July 31, 1963.

Heretofore, the processing steps from carding to combing in producing combed yarn from cotton, synthetic staples or the blends thereof were carried out generally by going through sequential steps viz. (1) a carding engine, (2) a sliver lap machine or drawing frame, (3) a ribbon lap machine or other lap machines, and (4) a combing machine. Also, at the end of each of the steps the sliver was either put into cans or the lap was wound up on spools and then conveyed to the next following step generally by hand. Hence, manual labor was required to convey the intermediate product from one step to the next and the transfer time was down time.

According to the present invention, a heavy weight sliver is produced by a carding engine, then a lap for the combing machine is produced by a novel process, which lap is then automatically treated and automatically delivered to a combing machine to be combed after drafting. The process of drawing the sliver delivered from the combing machine into a drawn sliver of still greater uniformity so as to be suitable for the roving frame or directly for the ring spinning frame is also automated.

After extensive research it was found that the laps produced by the conventional sliver lap machine and ribbon lap machine were not of the highest quality. As is known, the slivers delivered by conventional carding engines, have many more fibers with trailing hooks than with leading and both end hooks, in fact nearly half the fibers have trailing hooks. As a result, an intense directional character remains in the lap delivered from the carding machine and fed to the combing machine. Also the draft used during the lap production process influences the amount of hooked fibers and thus has a pronounced effect on the performance of the comber. In view of the foregoing, it is extremely difficult to integrate the lap producing steps and to shorten these processes without adversely affecting the comber. In addition, the subsequent drawing step necessary for bringing the sliver which has been subjected to the combing action to a condition suited for the roving frame or the ring spinning frame is difficult to simplify due to the uneven state of the comber sliver.

The present invention combines the above-described novel production processes and automates the entire process, whereby starting and stopping of the whole apparatus is made possible. Hence, the economic effects are tremendous in that productivity is enhanced as a result of highly efficient operation by means of a simplified novel process and in which good quality yarn is obtained at an improved rate.

A primary object of this invention is to provide a process and device for producing a heavy weight sliver on a carding engine. Another object of the invention is to provide a process as well as an apparatus for producing a lap for the combing machine from a carded sliver. Still another object is to provide, in a combing machine, a lap feeding method and apparatus provided with a doubling and drafting means, this lap feeding method and apparatus becoming also a feeding method and apparatus for feeding the sliver to subsequent operations. A further object of the present invention is to provide a method as well as an apparatus for treating combed slivers before they are applied to a fly frame or directly to a ring spinning frame.

Another object of the invention is to provide a combing machine having an automatic lap feeding means which is capable of feeding the comber lap to a designated combed.

An additional object of the invention is to provide an apparatus which automatically receives the full lap to be fed to the combing machine and then conveys and supplies the lap. This apparatus can also be utilized for the conventional automatic "in-succession" full lap receiving and conveying apparatus.

Yet another object of this invention is to connect together the hereinbefore described various processes and apparatus and provide an integrated process for automating and making continuously the processing steps in the combed yarn process comprising a carding process, a combing process and a postdrawing process adapted to make a sliver to be applied to a roving frame or directly to a ring spinning frame.

In order to attain the foregoing objects, the present invention uses a process for producing a combed sliver automatically and continuously starting at the carding step which comprises, in sequence:

(1) Forming a comber lap by doubling and drawing at least two of many slivers having a weight of at least 130 grains per yard which slivers have been delivered from a plurality of carding machines, and taking up at least two of the thus drawn slivers onto a bobbin;

(2) Automatically doffing the said comber lap on the cradle plate of a lap receiver every time the lap forms, and transporting the doffed lap to a desired comber while holding it by an overhead carrier; and (3) Doubling the fleeces of at least two of the said comber laps delivered to each comber, drafting and combing them at every delivery, and collecting and drawing them into one combed sliver.

The operation is automatiaclly effected beginning with the production of carded slivers moved at the rate of production to a drawing and lapping machine which receives a plurality of slivers and forms a lap which is wound on a spool at the rate of production of said lap. As each lap is formed, it is stopped and picked up in the cradle plate of a lap receiver which lap receiver is movable to the output side of said lapper. The lap receiver holds the lap until an approaching lap carrier activates a lap lifter to lift the lap and transfer it to said carrier. The carrier moves by means of an overhead rail from the pick-up point to a comber station containing a plurality of combers. The carrier releases the lap in response to the presence of an empty lap feeder at one of the combers. When the lap is deposited, the lap feeder is activated to deliver the lap to an empty comber after which the feeder returns along rails to wait receipt of another lap from a subsequent lap carrier. Once the lap is received at the comber, a comber feeding device comprising an endless belt receives the lap and unwinds it. This sequence of operations is continuously and automatically produced by the use of the present invention.

This invention will be described with reference to the accompanying drawings, in which.

Figure 5:
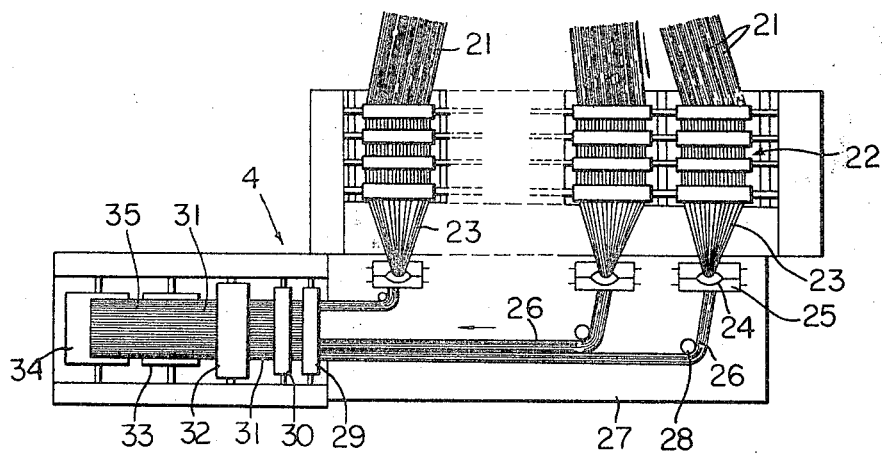
Figure 6:
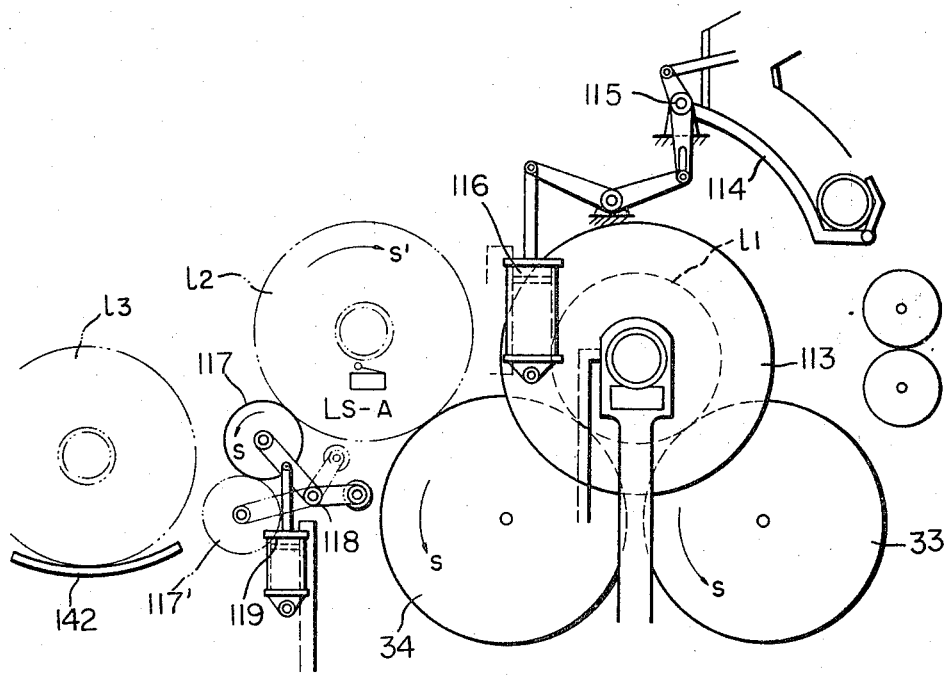
Figure 7:
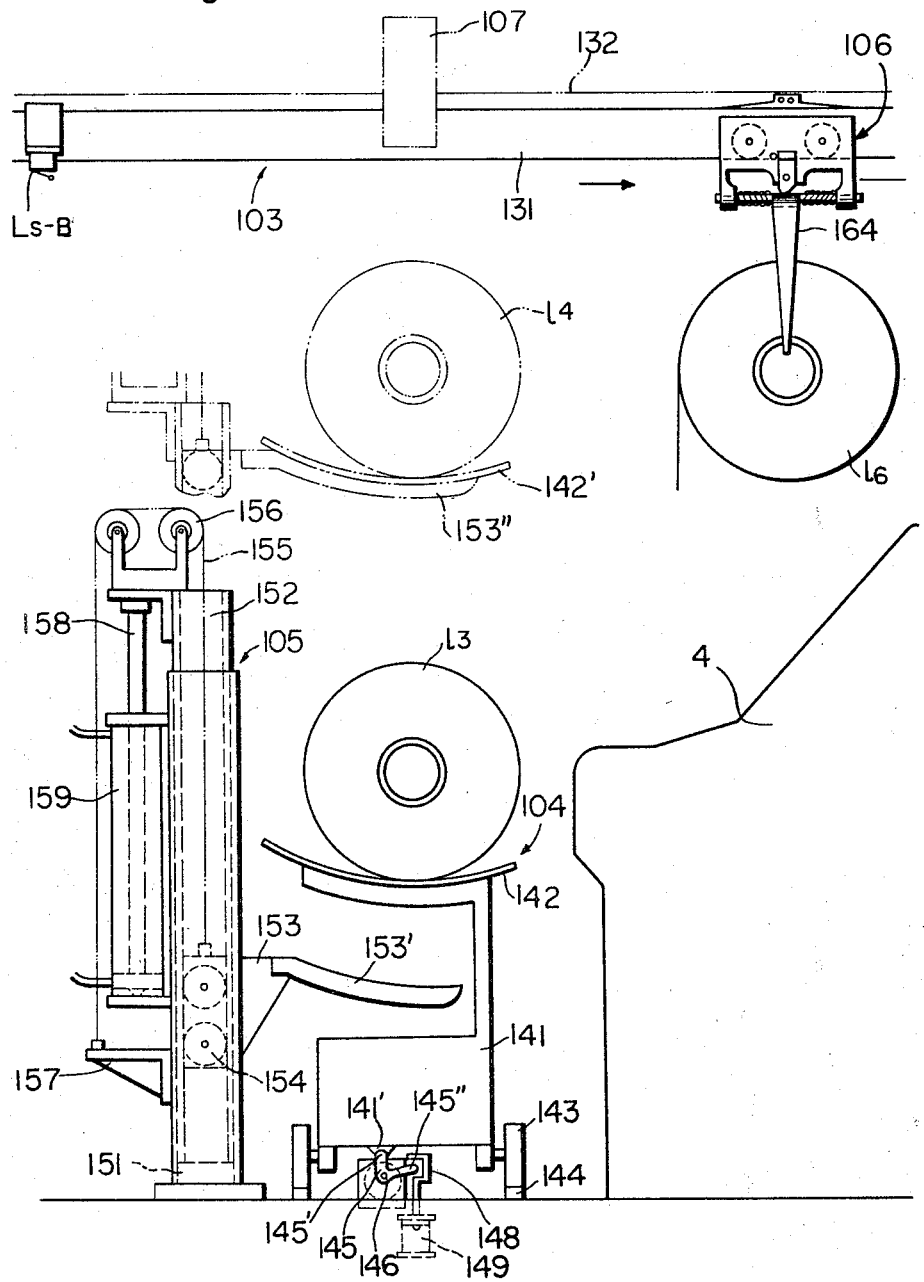
Figure 8:
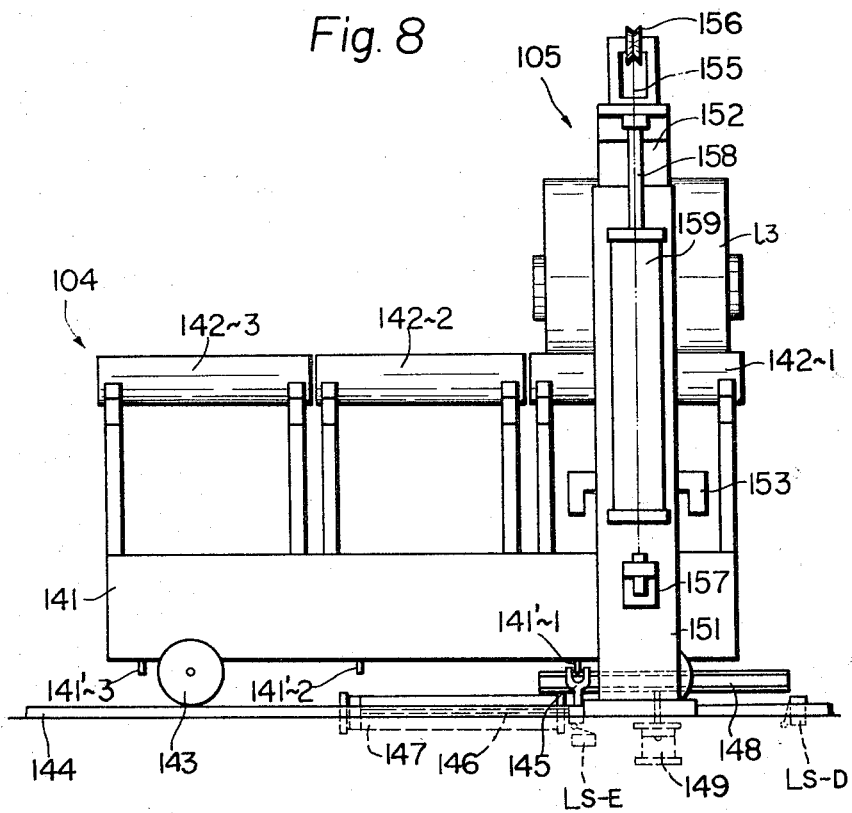
Figure 9:
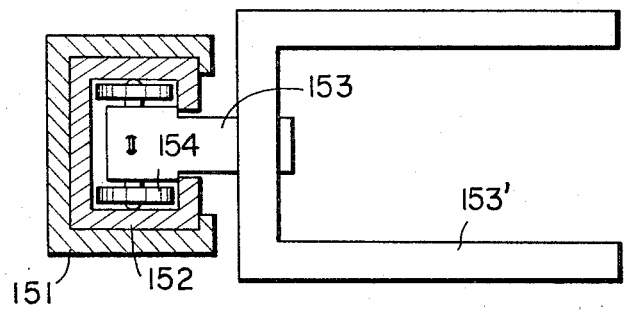
Figure 12:
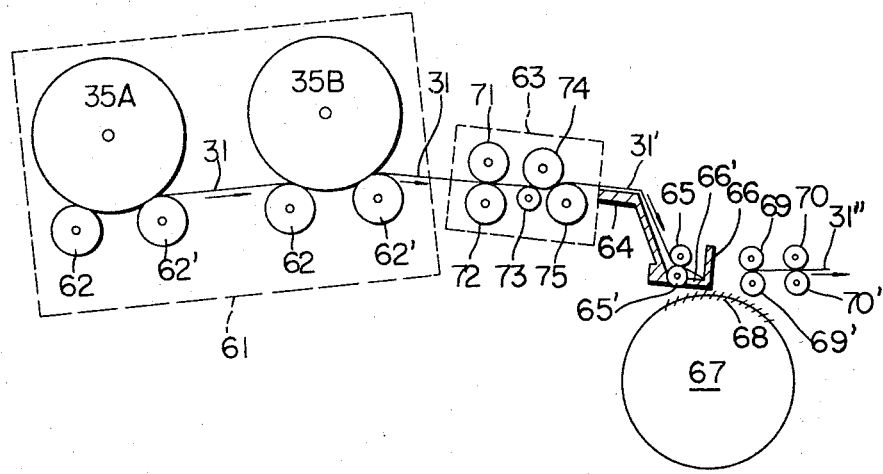
Figure 13:
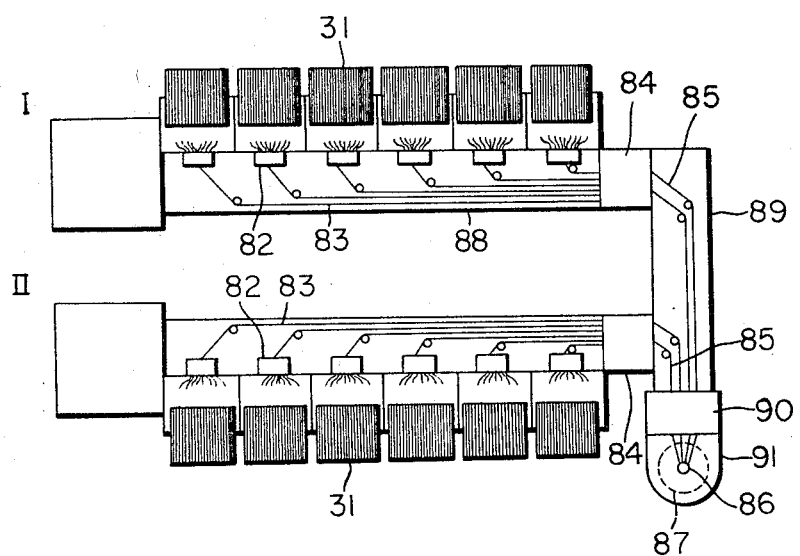
Figure 14:
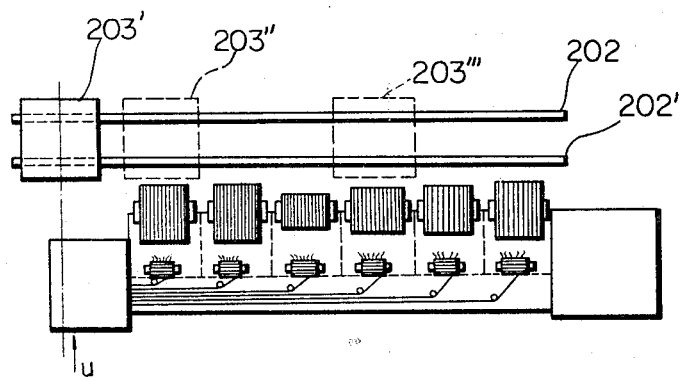
Figure 15:
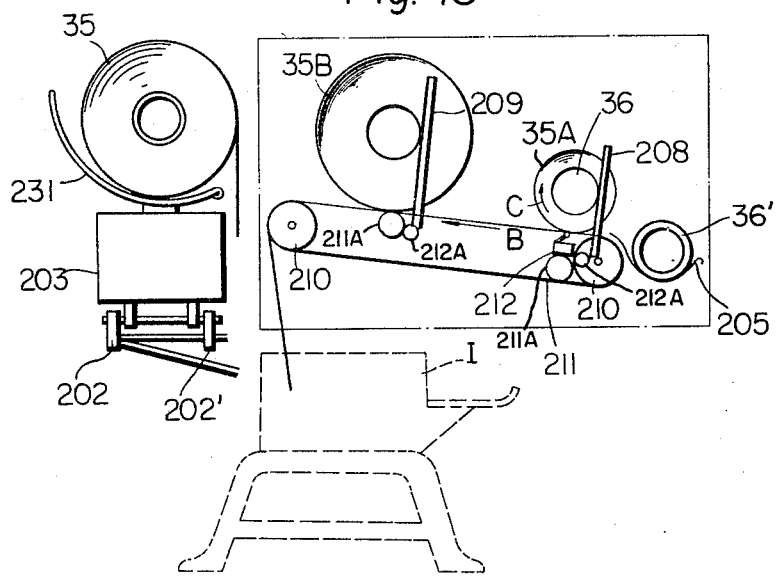
Figure 16:
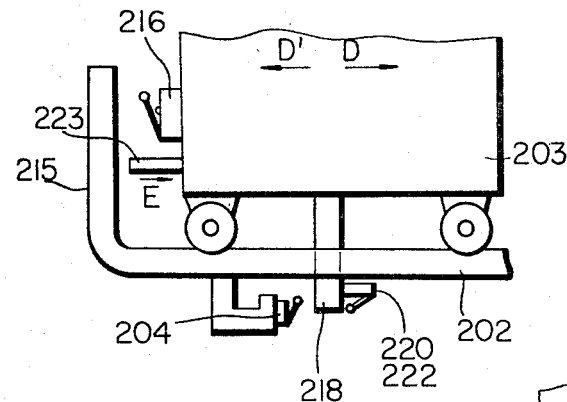
Figure 17:
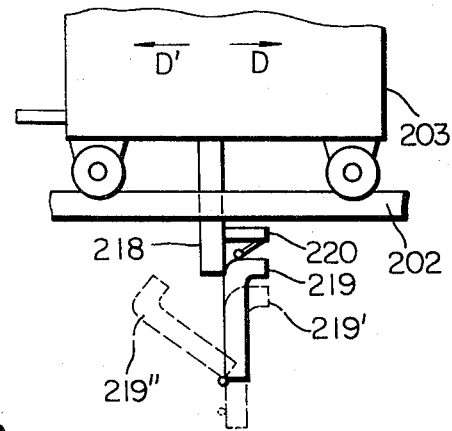
Figure 18:
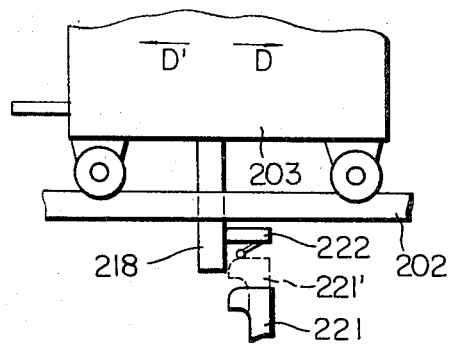
Figure 19:
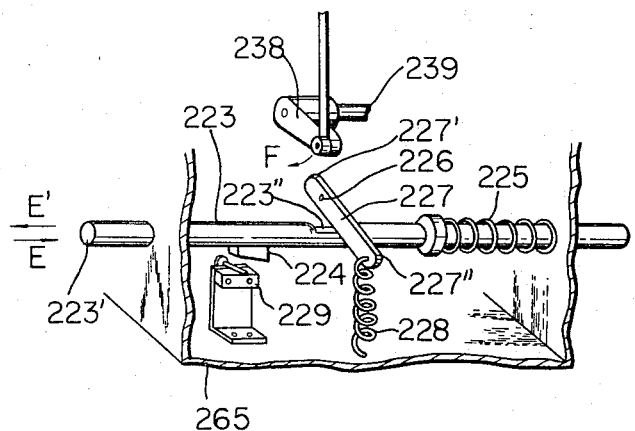
Figure 20:
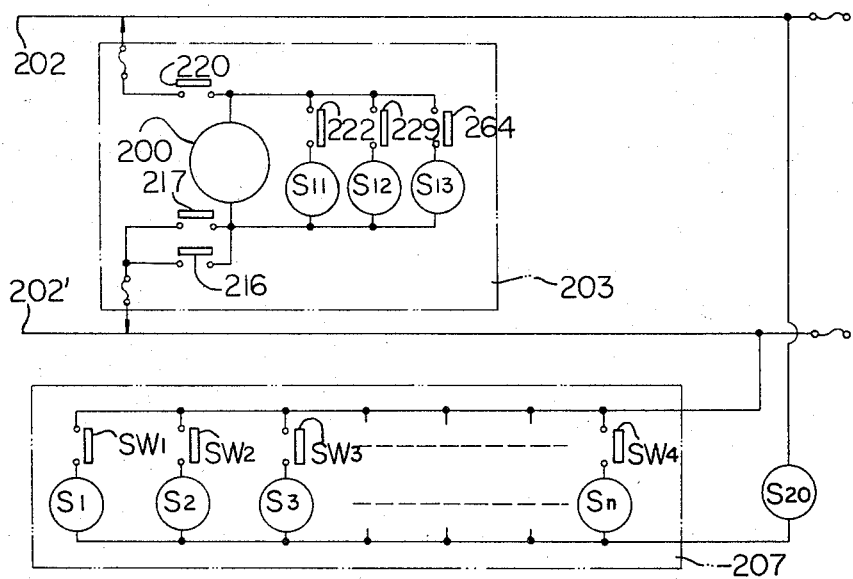
Figure 21:
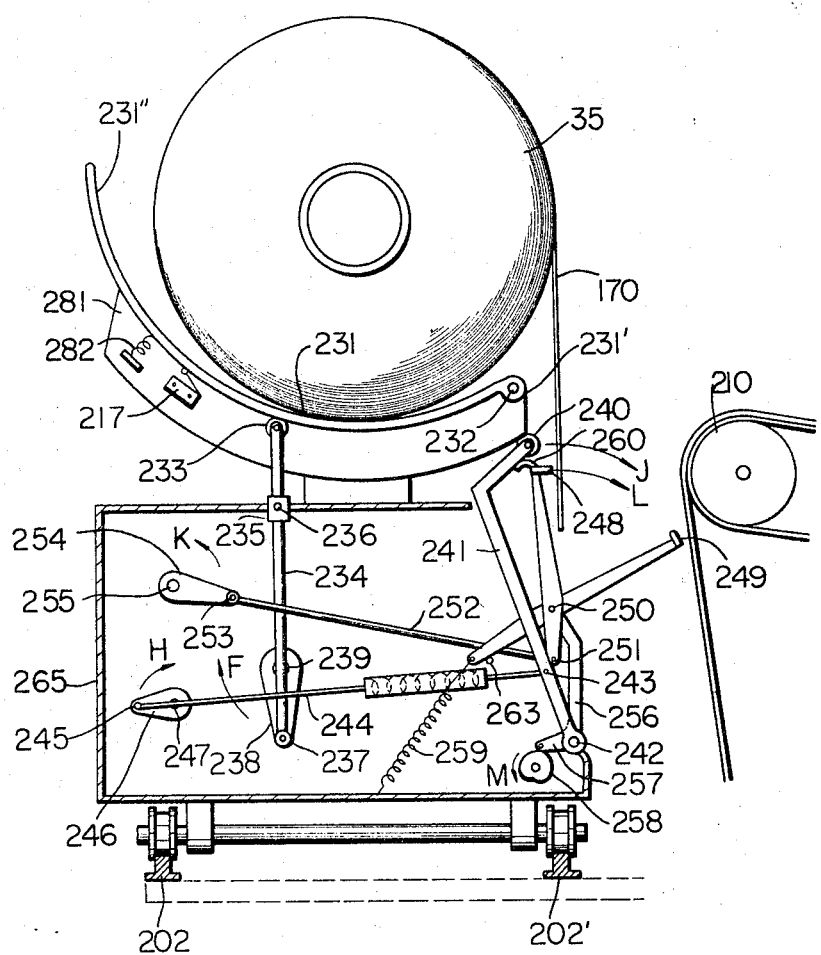
Figure 22:
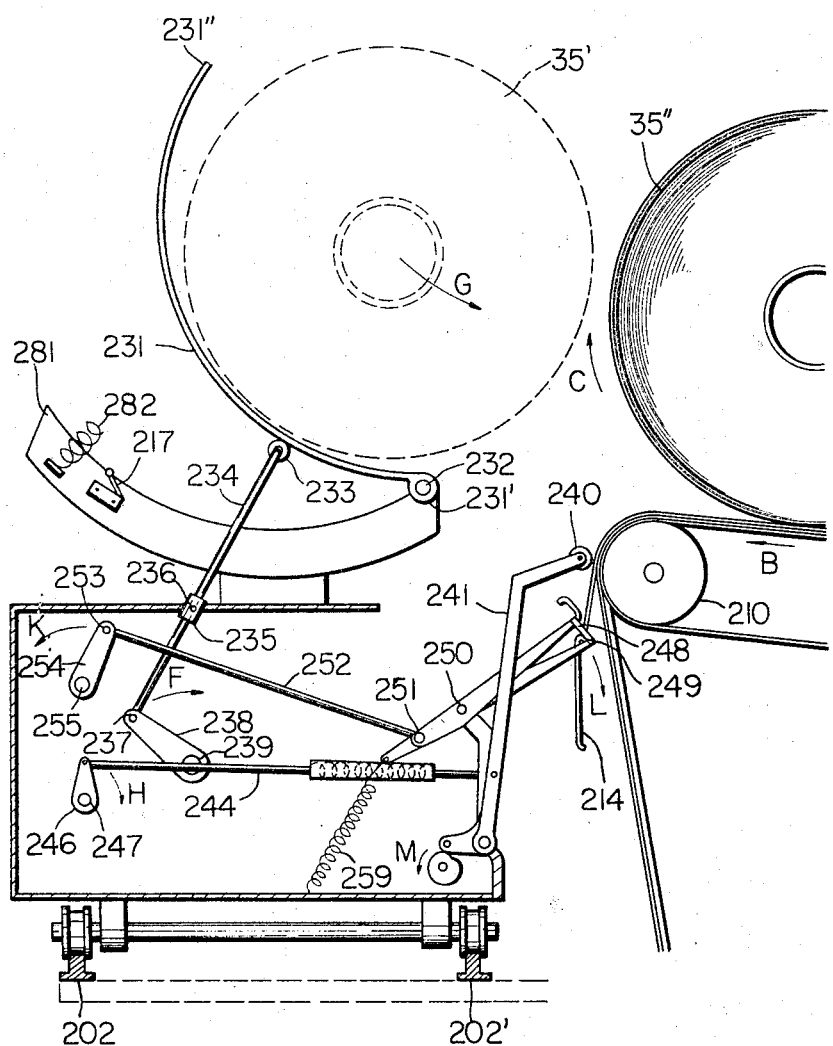

FIG. 5 a plan view of a set up illustrating the drawing and lapping process;

FIG. 6 is a schematic elevation illustrating the automatic doffing mechanism of the drawing and lapping machine;

FIG. 7 is a side view showing the construction of the lap receiving apparatus and lap lifting apparatus;

FIG. 8 is a front elevation illustrating the construction of the lap receiving and lap lifting apparatus;

FIG. 9 is a cross-sectional view showing the construction of the support of the lap lifting apparatus;

FIG. 10 is an elevation illustrating the construction of the lap carrier;

FIG. 11 is a side view of said lap carirer as seen from the direction XI—XI of FIG. 10;

FIG. 12 is a view illustrating the method of feeding a lap to a comber;

FIG. 13 is a plan view of a sliver treatment apparatus of the comber;

FIG. 14 is a plan view illustrating the over-all operation of the automatic lap supplying function;

FIG. 15 is a partial schematic side elevation of the apparatus of FIGURE 14;

FIGS. 16–18 are side elevations of a movable type automatic lap supplying feeder, FIG. 16 being a view illustrating it when stopped in the lap receiving position, FIG. 17 a view showing it stopped in its waiting position and FIG. 18, a view showing the foregoing apparatus being stopped in its lap supplying position for starting the lap supplying operation;

FIG. 19 is a perspective view, partly in section, illustrating a device for changing the direction of movement of the automatic lap supplying apparatus;

FIG. 20 is an electric circuit diagram of the automatic lap supplying apparatus;

FIGS. 21 and 22 are elevations in vertical section illustrating the essential construction of a portion of the automatic lap feeder FIG. 21 showing the state immediately before the start of the supplying operation and FIG. 22, the feeder in operation;

FIG. 23 is a front elevation showing the construction of the lap grasping apparatus;

FIG. 24 is a front elevation showing the construction of the lap releasing apparatus.

Referring in detail to the drawings, specific embodiments of the invention will be described.

Figure 1:
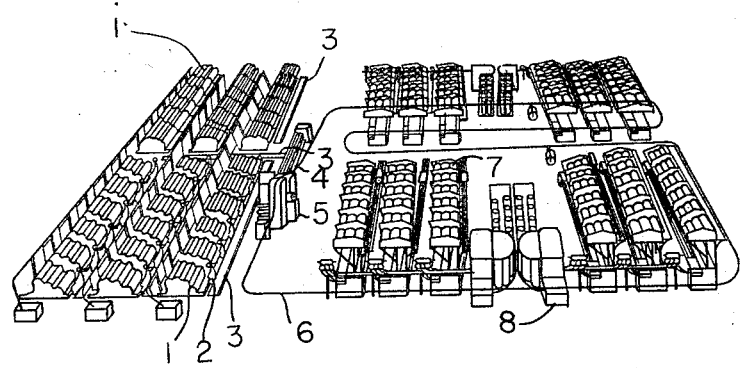
FIG. 1 is a block diagram in which as shown the sequential arrangement of the processes beginning with the carding process through the combing process ending in the postdrawing process for the combed sliver.

FIGURE 1 illustrates a method of practicing the invention wherein the components are organized into a single system. Reference numerals 1, 2, 3, etc. indicate each stand for an apparatus or process. Numeral 1 designates the carding process which utilizes a plurality of carding machines; from twenty to forty machines may be lined up in several rows. The surface speed of each carding machine is reduced to as low a speed as possible to produce slivers of heavy weight. Numeral 2 is the sliver reserve box with its accessory devices which is disposed immediately following the calender roller of the delivery section of each carding machine to regulate the starting and stopping of the carders. As shown in the drawing 1 and 2 are combined in a sequence in accordance with the flow of material and are established as a unit, a plurality of such units for example from twenty to forty are lined up in parallel alongside a sliver conveying apparatus 3. The sliver conveying apparatus 3 is an apparatus which conveys the slivers drawn out from the sliver reserve box 2 to the next following drawing and lapping process 4 ensuring that the slivers do not become entangled. The conveyor may comprise a belt conveyor. In FIG. 1 the conveyor is illustrated as comprising a branch conveyor which passes along the front of each carding machine and a main conveyor which is disposed at right angles to these branch conveyors passing longitudinally through the middle of the group of carding machines. The carded sliver delivered from each carding machine proceeds via the sliver reserve box 2 and is laid upon the branch conveyor passing along the front of each carding machine in such a manner that its does not become entangled with the carded sliver delivered from the neighboring carding machine. The carded sliver is then laid along with the slivers from the other branch conveyors on the main conveyor in their respective prescribed positions, after which all of the carded slivers are conveyed together to the feeding section of the drawing and lapping machine 4 located at the end of the main conveyor. The drawing and lapping machine comprises several deliveries of main drawing parts, lap winding parts and lap drawing parts immediately preceding the latter. The carded slivers which have been conveyed together from the main conveyor are divided equally in groupings in accordance with the number of deliveries of the drawing and lapping machine and each grouping is drawn at a high drafting ratio, then condensed into a sliver and wound up on a spool by means of a lap winding part and a lap drafting part. The lap winding part, as described previously, is provided with an apparatus 5 whereby a full lap is automatically doffed without stopping the drawing and lapping machine. It is also adapted to convey the doffed lap automatically to combing machines 7 of the following component by means of an automatic lap transporting means 6 provided to cooperate with the automatic doffing apparatus 5. The laps are doubled and combed at combing machine 7. Then they are formed into comber slivers. The combed sliver is then doubled and drawn at drawing machines 8.

CARDING MACHINE

Figure 2:
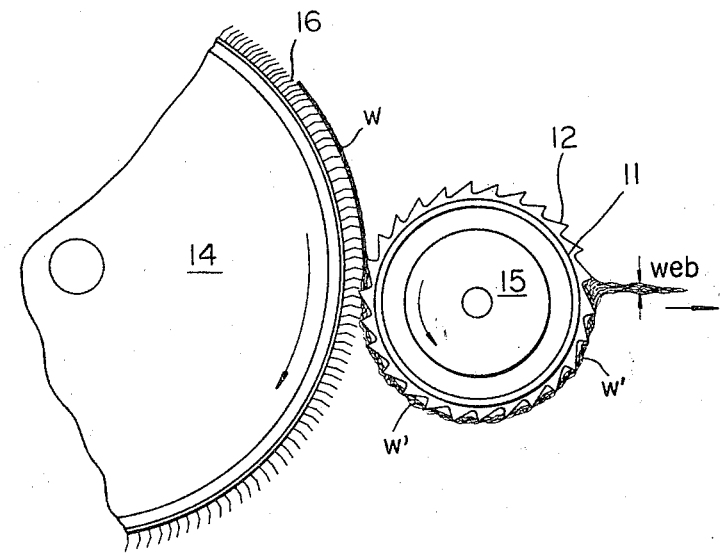
FIG. 2 is a side elevation showing the essential parts of a carding machine.
Figure 3:
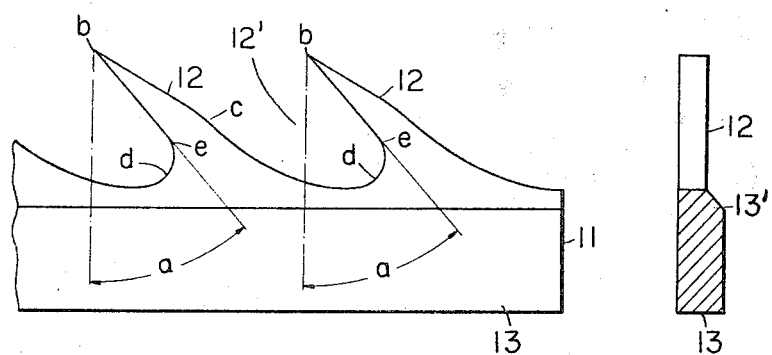
FIG. 3 is a partial side elevation of a metallic wire for the doffer.
Figure 4:
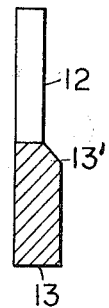
FIG. 4 is a sectional view of the aforesaid metallic wire.

The carding machine employed in the present invention uses a doffer generally shown as 15 in FIG. 2, which is provided with a metallic wire 11 whose scoop angle is made as large as possible and whose pockets are made large, while the number of tips is reduced. Referring to FIGS. 3 and 4, the configuration of the teeth is shown, the scoop angle $a$ of the teeth is from 30–40 degrees, while the upper part of the tooth back $b-c$ is straight and the lower part thereof $c-d$ is curved concavely. The bottom $d-e$ is broadened as much as possible, whereby the space $b-c-d-e-b$ between one of the tips $b$ and the succeeding tip, i.e., the pocket, has been made as wide as possible, for example an area of 3–4 mm.² As seen in FIGURE 4, the width of the foot 13 is wider than that of tooth 12 and one side of that part 13′ where the tooth 12 meets foot 13 is inclined to increase the interval between the tips. Thus, with the intervals between the tips being made great, the number of tips of the wire 11 may be 200-250 points per square inch. By using a doffer 15 mounted with such a wire and by rotating the doffer at a speed 1/100 that of the cylinder 14, the fiber transferred from the doffer is maintained at 0.070-0.17 grain per square inch on the surface, and a sliver of very heavy weight per unit length is produced. Also the normal collecting power of the doffer can be maintained in transferring the web W from the cylinder 14 to the doffer 15. For example, when a doffer wire whose scoop angle is 40 degrees, pocket area is 4 square millimeters and tips number 228 points per square inch was used and a sliver of 170 grains per yard was produced under the conditions given above, the web collecting power was maintained at above 5%.

On the other hand, when a doffer was used having mounted thereon a conventional wire having a scoop angle of 20-30 degrees, a pocket area of 2-2.5 square millimeters and tips numbering 400-500 points per square inch, and a sliver of 170 grains per yard was produced with the rotation of the doffer reduced with respect to the cylinder, the collecting power of the web fell to 0.9% and hence was extremely unsatisfactory as compared with the above noted collecting power of above 5%. In consequence, the yield declined and nips increased as a result of a detention of a large amount of fibers on the cylinder. In addition, power losses resulted in the latter case because of the increased resistance set up between the cylinder and the flat.

DRAWING AND LAPPING MACHINE

FIG. 5 illustrates the drawing and lapping process 4, one of essential parts of the present invention. As generally indicated, a main drawing part 22 is made up of several deliveries, to each of which deliveries several strands of the carded sliver 21 are uniformly fed and drawn at a drafting ratio at least above 7:1. This drawing device may be any known roll setup and material. The carded slivers 21 drawn at this drawing device becomes a fleece 23, which is then gently condensed by means of trumpet cups 24. After application of pressure by a pair of calender rollers 25 provided at this point, the fleeces are delivered to the next step. Thus, the several slivers delivered from the several deliveries become a flat tape-like sliver 26 by the calendering action and, because of the gentle condensing action of the trumpet-cups 24. The tape-like slivers 26 are then laid uniformly and flatly on a table 27 and their direction of travel is changed by means of guides 28, they are then fed to drawing rollers 29, 30 disposed immediately preceding the lapping part. The drawing rolls 29, 30 are of known structure consisting of several superposed rollers. The slivers fed onto the table 27 and are then drawn at a low drafting ratio of not more than 2:1, for example, 1.2:1 between rolls 29, 30. Then the drawn slivers are combined with the adjoining slivers and formed into a lap, obliterating the stripes made by the individual slivers 26. The sectional configuration of the resulting lap is adjusted and the fibers are lined up straight without any irregularities. The fleece 31 which has become lap-like by being drawn by rollers 29, 30 is calendered by one or two pairs of calender rollers 32 and then wound up onto a spool (not shown) by means of fluted lap rolls 33, 34 to become a wound lap 35.

A lap receiving apparatus 104 is disposed in front of the drawing and lappilng machine and transversely to the lap doffing direction of said machine means 104 is capable of shifting horizontally a distance equal to the width of the lap. A lap lifting apparatus 105 is disposed on the side the lap machine opposite to side having the lap receiving apparatus. Above these machines is disposed an overhead endless rail 103 which passes above the machine and apparatus and then above one side of the line of combers. Lap carriers 106 are disposed at given intervals along rail 103 (FIG. 7). When a lap carrier traveling over rail 103 is in its empty state and is approaching the lap lifting apparatus 105, the lap discharged from the drawing and lapping machine 1 passes onto lap receiving apparatus 104 (FIG. 7) and while being carried by the lap cradle plate 142, is lifted by means of the lap lifting apparatus 105 up towards the rail 103 where it awaits the arrival of the carrier 106. The empty carrier 106 while continuing its travel clasps the pushed-up lap and then continues its movement in the same direction and travels along the line of combers 7. (FIG. 1.) The several combers are each provided with a lap feeder 203, hereinafter described, for supplying laps to the combers, the lap feeder being so mounted as to be capable of reciprocative movements over a different set of rails in alignment with the deliveries of the combers. The feeder, when not loaded with a lap, is adapted to move below rail 103 and stand by for receiving a lap. When lap carrier 106 which is clasping a lap and traveling while depending from rail 103 passes above feeder 203 of FIGURE 15 it releases the lap onto said feeder and then continues its travel along the same.

(i) Lap receiving apparatus

The drawing and lapping machine from which the spooled lap is discharged onto the lap receiving apparatus or receiver is preferably equipped with an automatic doffing apparatus described in British Patent 1,024,615. The general operation of such a machine will be described with reference to FIG. 6. When lap 35 or $l_1$ which is being wound above lap rollers 33, 34 it is clasped by a pair of lap disc plates 113 becomes full by having attained its prescribed wound length, the lap disc plates rise and the clasp on the full lap is released since said disc plates open both sides. Then a spool supplying device 114 disposed in the rear and holding a new spool is rotated clockwise about shaft 115 by means of piston 116 and lap $l_1$ which has become full is pushed out between the front lap roller 34 and auxiliary roller 117 this is indicated as dotted line lap $l_2$, the winding up of $l_2$ is continued until the severed tail end is wound up. Auxiliary roller 117 then descends about shaft 118 as a result of the descent of piston 119, and lap $l_2$ is discharged onto cradle plate 142 of the lap receiver to become lap $l_3$.

The lap receiving apparatus, as shown in FIGS. 7 and 8, consists of a lap traverser 141, rails 144 over which said traverser moves and means for effecting movement of the traverser. Provided above lap traverser 141 are a plurality of cradle plates 142 (in FIG. 8 indicated as 142-1, 142-2 and 142-3 depending upon their position) upon which the laps are to be loaded. The cradle plates are designed so that projections provided perpendicularly on the underside of the cradle plates fit into (not shown) the top of traverser 141 thereby rendering the cradle plates readily detachable upwardly but preclude their shift horizontally. Further, the supporting members of the cradle plates are provided in cantilever fashion to ensure that they do not become a hindrance to the hereinafter-mentioned fork 153'. In addition, at the bottom of lap traverser 141 are provided wheels 143 whereby the traverser is capable of moving freely over rails 144 installed in the floor in such a fashion as to cross the front of the lap machine at right angles. Referring to the means for effecting the traverse of the traverse of the traverser, one suitable means comprises a hydraulic cylinder 147 (FIG. 8) which is secured beween rails 144 on the floor in parallel with said rails, the distal end of piston rod 146 which makes sliding movements in said cylinder 147 is loosely provided with an L-shaped lever whose tip 145', (FIG. 7) is bifurcated, and is adapted to engage dog 141' secured to the underside of traverser 141. Tip 145" is a lateral piece of lever 145 and fits loosely in a sliding guide 148 and is slidable therein. Sliding guide 148 has a length equal to that of the stroke of piston rod 146 and its underside is secured to the top end of a piston rod of a second hydraulic cylinder 149 which is mounted perpendicular to the tracks. When sliding guide 148 is in its raised position, then tip 145' of L-shaped lever 145, as shown in FIG. 7, is in engagement with dog 141'. When main piston rod 146 makes a sliding movement axially in this state, the lap traverser 141 is caused to move over rails 144 in the direction in which said piston rod moves for a distance equal to that of the stroke of the piston. On the other hand, when sliding guide 148 is in its lowered position, tip 145' of L-shaped lever 145 pivots about piston rod 146 and becomes disengaged from dog 141', with the consequence that lap traverser 141 does not move, even though piston rod 146 makes a sliding movement. Further, since the plurality of cradle plates 142–1, 142–2, 142–3 . . . . are juxtaposed with prescribed intervals sufficient to accommodate the several laps and the stroke of cylinder 147 is equal to the width of the cradle plates or the lap, the lap traverser 141 moves an amount just equal to a single cradle plate upon each actuation of said cylinder 147. Further, the dogs 141' are provided in positions corresponding to the several cradle plates. Now, by applying hydraulic pressure to cylinder 149 so as to push up its piston rod sliding guide 148 is placed in its raised position; if hydraulic pressure is applied to cylinder 147 so as to push piston rod 146 outwardly, the lap traverser 141 moves over rails 144 a distance equalling the length of the stroke of piston rod 146, i.e., equal to just the width of one cradle plate, since lever tip 145' moves while in engagement with dog 141–1. Next, if, prior to the time piston rod 146 is retracted, the hydraulic pressure to cylinder 149 is released and sliding guide 148 is placed in its lowered position, lever tip 145' is disengaged from dog 141'–1 and piston rod 146 with lever 145 retract independently of the lap traverser 141, and as a result, the lap traverser remains intact and has been moved a distance equal to the width of just one cradle plate. When cylinder 147 reverts to its original position and piston rod 146 and lever 145 reach their end point, then if sliding guide 148 is again raised by supplying hydraulic pressure applied against cylinder 149, tip 145' comes into engagement with dog 141'–2 which corresponds with the next cradle plate.

(ii) *Lap lifting apparatus*

The lap lifting apparatus 105, as illustrated in FIGS. 7, 8 and 9 comprises a base stand 151 secured to the floor and standing perpendicularly, a sliding stand 152 which slides up and down in said base stand, a sliding block 153 which, in turn, slides up and down in said sliding stand 152 and which has rollers 154 on either side thereof, a roller chain 155 has one end attached to block 153 and another end attached to a bracket 157 secured to a lower part of base stand 151 on the opposite side of guide wheels 156 provided at the top of sliding stand 152. A piston rod 158 makes sliding movements in a hydraulic cylinder 159 and is attached via a bracket to the top of sliding stand 152. Further, the tip of sliding block 153 forms a fork 153' which is adapted to be inserted under the aforesaid cradle plate to lift it upwardly. When hydraulic pressure is applied to cylinder 159 from its underside, sliding stand 152 rises due to piston rod 158 a distance equal to the stroke length of 158. Further, since guide wheels 156 are provided rotatably at the top of sliding stand 152 and since roller chain 155 is mounted over said guide wheels and secured at its one end to bracket 157 with its other end connected to sliding block 153, when sliding stand 152 is raised by means of hydraulic pressure, sliding block also rises slidingly in sliding stand 152. Hence, sliding block 153 rises with respect to base stand 151 a height equal to twice the stroke length of piston rod 158. In order to ensure that the cradle plate 142 does not oscillate when extended on the fork 153' in the up position a plurality of small projections are provided under the cradle plate at suitable locations to contact the surface of fork 153' whereby these projections may fit into the top surface of the fork.

(iii) *Lap carrier*

The several lap carriers 106 and their attachment to the rail 131 are shown in detail in FIGS. 10 and 11. An upper part is provided with carrier wheels 162 which travel in rail 131 an I beam and a lower part is provided, the lap clasping part, which comprises a pair of symmetrically arranged downwardly facing hooked arms 164. Arms 164 are pivotally mounted so as to be movable about a shaft 165 which is disposed longitudinally of the direction of travel of the lap carriers. Springs 166 and 166' are provided about shaft 165 which shaft is disposed at the lower central part of carrier body 161. Springs 166 and 166' normally exert a biasing action on the hooked arms 164 in the directions of arrows $u$ and $u'$, i.e., they tend to open hooked arms 164. Further, above shaft 165 and at right angles thereto is provided another rotatable shaft 168 which has rotating levers 167 secured at both ends thereof. The bottom ends of these levers are adapted to press against the shoulder portions 164" of hooked arms 164. Levers 167 also have springs 169 and 169' mounted about shaft 168 and the springs exert biasing actions to keep levers 167 turned normally towards direction $t$. In addition, fixed projections 163 are provided on body 161 at a point near the upper part of levers 167 on the side towards which the carrier travels by which levers 167 are stopped from turning towards the direction $t$ beyond their perpendicular position. Thus, if rotating levers 167 are turned towards direction $t'$ against the biasing actions of spring 169, 169', the pressure of levers 167 against the top of shoulder portions 164" of the hooked arms is relaxed and, the hooked arms 164 are turned in directions $u$ and $u'$ by means of the biasing actions of springs 166 and 166', respectively, to open the tips 164' of the hooked arms 164. Then if the two hooked arms are both closed at the same time against the biasing actions of springs 169, 169' by means of an external force, the rotating levers 167 which had been in an inclined position turn back towards the direction $t$ by means of the biasing actions of springs 166, 166' until they hit the projections 163 and assume their upright position. Even though the external force is thereafter removed from the hooked arms 164, they remain closed, and even though hooked arms 164 are subjected to an external force tending to open, arms 164 do not open so long as levers 167 are not turned towards direction $t'$ positively, because levers 167 are in a locked position. Hence, referring to FIGURE 7 lap $l_6$ carried by arms 164 is not released or dropped accidentally during the time it is being transported, Again, when necessary, lap $l_6$ can be released by turning levers 167 downwardly from their upright position.

Lap carrier 106 is suspended from rail 131 by carrier wheels 162 which have been mounted rotatably in the upper part of its body. Above rail 131 and centrally thereof a roller chain 132 of FIGURE 7 is mounted facing in a sidewise direction. A projecting portion 161' is attached to a specific link of said chain one side of carrier body 161. Rail 107 that are secured to its upper side, which brackets are of such a configuration as do not hinder the travel of carrier body 161. At each point of directional change in the transport course, chain 132 may be mounted above guide wheels loosely fitted to shafts of the transport course. Thus, the chain is mounted so as to rotate along the rail at all times. One or more electric motor-driven driving wheels are provided in this course, and thus with roller chain 132 being driven by said wheels the lap carriers 106 are caused to travel over rail 131. Further, a projection 161" at the upper side of one side of body 161, as hereinafter described, serves as the contactor of limit switches to be operated during the travel of the lap carriers.

The rail 131 has a lap clasping apparatus 107 of FIGURE 7 directly above the lap receiving apparatus and several lap releasing apparatuses (not shown) above the corresponding lap feeders of the combers.

The lap clasping apparatus is provided with symmetrical members straddling the rail, a pair of hydraulic pistons having distal ends of pistons rods which can protrude to press downwardly on the shoulder portions of the hooked arms to turn the arms inwardly for clasping spools of the lap. The releasing apparatus is also provided with symmetrical members straddling the rail, a pair of solenoids which, upon energizing, move their rods downwardly to turn lever 167 and release the lap from the carrier 106 to the comber. These operations may be conducted in the manner of in the patent application filed by Ando et al. on Oct. 12, 1964, Ser. No. 405,327, now U.S. Patent 3,338,432.

The lap grasping apparatus whose construction is shown in FIGURE 23 straddles rail 431 directly above the lap receiving apparatus. To the upper side of carrier rail 431 is secured a bracket 471 having a configuration such that it does not hinder the travel of lap carrier 407. Hydraulic cylinders 472 are attached symmetrically to the upper part of bracket 471 which extends outwardly over both sides of rail 431. Cylinders 472 which face downwardly having piston rods 473 with the distal ends of which are secured brackets 474 fitted with rotatable rollers 475. As shown in the figure, each piston rods 473 are thrust out simultaneously in the downward direction when hooked arms 464 in the open position pass below said apparatus ratus rollers 475 press downwardly on the shoulder portions 464" of hooked arms 464 and as previously described, turn the hooked arms inwardly so hooks 464' grasp the spool of a lap tape 14. Switches $L_{S-B \text{ and } C}$ control the actions.

Along the carrier rail and above the several lap features are disposed lap releasing apparatuses shown in FIGURE 24. Bracket 491 has a configuration which does not hinder travel of lap carriers 406. Bracket 491 is secured to the upper side of rail 431 and on the upper part of this bracket are attached symmetrical electromagnets 492. Moving cores 495 which pass through the center of said electromagnets having affixed to their bottom ends downwardly facing rods 493 which are guided by the end portions 491', 491" of bracket 491. Rods 493 and cores 495 are normally urged upwardly by means of the biasing action of springs 494. When a lap carrier 406 passes, limit switch $L_{T-1}$ is operated by switch contactor 461" of said carrier energizing both electromagnets so rods 493 are depressed to the dotted line position 493'. Hence, the heads of turning levels 467 of the lap carrier passing under the lap releasing apparatus collide with rods in the position 493' and by being turned in direction $t'$ move to the position shown by dotted line 467'. The resulting pressure against shoulder portions 464" of hooked arms 464 is released whereby hooks 464' are opened by the biasing action of springs 466, 466' and the lap is dropped. Then, as lap carrier 406 passes beyond the releasing apparatus a limit switch (not shown) is pressed by switch contactor 461" to de-energize electromagnets 492 and cause rods 493 to return to their original position.

COMBING MACHINE

In FIG. 12 is illustrated a setup of a combing machine for use in this invention in which, immediately prior to combing, a single fleece of lap or two or more thereof are doubled, then drafted, after which combing is performed to make a sliver. The combing effect has been enhanced by drafting the lap immediately prior to the combing step by providing an apron or roll type doubling and drawing device 63 between a lap feed device 61 and a pair of lap fed rolls 65, 65'. In the embodiment shown in FIG. 12, the drawing device 63 comprises two upper rolls 71, 74 and three lower rolls 72, 73, 75, the upper and lower rolls abutting each other and hence adapted to draft the lap therebetween. Lap fleece 31 of spooled lap 35A, 35B is fed to the drawing device 63 by being delivered under suitable tension by means of lap rolls 62, 62' when a single lap is being fed and a plurality of sets of lap rolls 62, 62' when a plurality of laps are being fed. In the figure is shown the instance where two wound laps 35A, 35B are being drafted. The lap fed to the doubling and drawing device 63 is subjected to a draft of several times between the back rolls 71, 72 and the front rolls 74, 75 to become a thick laplike fleece 31' delivered from the front rolls 74, 75. Lap fleece 31' proceeds via guide plate 64, and feed roll 65 so as to maintain lap fleece 31' with a suit-66' and combed by needles 68 of combing cylinder 67, after which it is delivered as 31" by means of detaching rolls 69, 69' and 70, 70'.

In this instance, the surface speed of front rolls 74, 75 is determined in advance in relation to the delivery speed of feed roll 65 so as to maintain lap fleece 31' with a suitable tension. Again, it goes without saying that the weight per unit length of the laps fed and the drafting ratio of the drawing device is regulated such that the weight per unit length of lap 31' delivered from rolls 74, 75 becomes a predetermined weight corresponding to the combing ability of the comber. However, in installing this device, since nippers 66, 66' oscillate together with feed rolls 65, 65', it is preferred either to cause the location at which lap fleece 31' leaves front rolls 74, 75 to concide with the oscillatory center of nippers 66, 66' or a position corresponding thereto, insuring that the distance between front rolls 74, 75 and feed rolls 65, 65' does not change; or still better to install a bar or a guide plate at this location to bend lap fleece 31' fed from the front rolls in response to the oscillation of nippers 66, 66'.

The process of postdrawing 8 (FIG. 1) the silver delivered from the combing process, when described with reference to FIG. 13, is as follows: Laps 31 applied to six to eight heads of the comber, after being subjected to the forgoing draft followed by the combing action, become laps 31", in FIGURE 12 and they proceed via table calender rolls 82 to be condensed and become table sliver 83. Then after moving over the silver table 88 a draft of several times is imparted at drawing device 84, the lap becomes either one or two ends of comber slivers 85. In the conventional process, the comber sliver is then immediately passed through a coiler head and collected in one or two cans, followed by carrying to a next postdrawing frame. In the present invention, however, a plurality of combers (shown as I, II, in FIG. 13) are disposed abreast. The comber slivers 85 delivered from the drawing device 84 of each of the linear groups are collected in one direction by means of guide plate 89 or other such guiding means and are made into a single end of sliver after passing through a drawing device 90, and then collected in a can 87 via a coiling device 86 of coiler head 91. In this case, the drawing device 90 is provided with an automatic regulator to keep the slivers even, which may be of any conventional form (not shown). For example, note the devices shown in United States Patent Nos. 1,111,290 and 2,950,508 issued to Birch et al. and Lacher, respectively. This regulator is adapted to automatically rectify the unevenness characteristic of the comber sliver and variations in sliver size occurring during windup and supplying of the lap, and thus enable collection of slivers that are uniform at all times in the cans.

The mechanism for moving the lap received from the carrier 106 of FIGURE 10 to the several heads of the comber is as hereinafter described. Any number of combers aligned with electrified rails 202, 202' in parallel with the same, an automatic lap supply unit 203 (hereinafter to be referred to as "unit") is carried by the rails. A motor 200 of FIGURE 20 is operatively connected to the unit 203 in any conventional manner for moving the same over the rails 202, 202'. Clutch means (not shown)

of any well known design are operatively interposed in the connection between the motor 200 and the unit 203 to effectuate reversal of the direction of travel of the unit 203 in any well known manner. The method of engaging and disengaging the clutch means will be explained in more detail hereinafter. The lap carrier 106 passes the upper part of the unit 203 in its stopped position, designated as the lap supplying position of 203, along a direction at right angles to the rails 202 of FIGURES 14. Hence the carrier 106 carrying the lap is adapted to supply said unit 203 with said lap.

When the lap supply unit 203 is at the position 203' immediately under the passage of the carrier 106, it is at the end portion of a rail 202 (FIG. 14), the limit switch 204 of FIGURE 16 is in the "on" position as shown in FIG. 16, thereby actuating a lap releasing apparatus such as one including electric solenoids which is provided on carrier rail 131 above the said unit 203. Thus, the lap is caused to fall down from carrier 106 travelling in the direction of an arrow $u$ onto saddle 231 of unit 203 immediately thereunder. The unit 203 loaded with a lap begins to move as below mentioned, and stops at a position 203'' where it waits for an order from a delivery of the comber for supplying the lap thereto.

A feeding device at the delivery of the comber shown in FIG. 15 is in principle the same as what is shown by reference numeral 61 in FIG. 12. As shown in FIG. 15, an endless belt 211 is provided between two pulleys 210 in a manner such that it is inclined forwardly. On the said belt 211 are placed two or more laps 35A, 35B, etc. which are rotated together with the rotation of the belt 211 in the direction of an arrow B and rewound. Pairs of stoppers 208, 209 and so on are provided on both sides of the belt to prevent the laps from falling off along the inclined face of the belt, and both ends of a spool 36 extending somewhat from each side of the lap are supported by these stoppers. The lap with the minor diameter which is at the lower end of the slope is already supplied and is being rewound. At this time, the end of the spool which has fallen on the belt pushes limit switch 212 it signifies the depletion of the lap. By this the clutch is actuated in a known manner, and the rotating force from pulley 210 is transmitted to a pair of rotating shafts 211A provided along both sides of the belt 211. Each of the said rotating shafts has cams 212A therealong corresponding to stoppers and adapted to prevent the displacement of the stoppers automatically at the end of one rotation.

Upon one rotation the upper ends of the stoppers 208, 209 and so on are angularly displaced in an outward direction by the cams. A series of these devices are not shown in the drawing, but any conventional ones can be used. By the rotation of the said pair of shafts, a pair of stoppers 208 displaces and disengages from the support of the spool 36 which falls into a spool holder 205 and becomes a spool 36'. Thereafter, the stoppers 208 instantly return to their original positions, and then the stoppers 209 begin to move in the same way. By this action, lap 35B moves to a position where it is supported by stoppers 208, and becomes 35A. This procedure is repeated. When the position of the final end lap (for example, the position 35B in FIG. 15) becomes vacant and the said rotating shaft equipped with a cam has revolved almost once, the rotation of the rotating shaft causes the limit switch $SW_n$ of the said delivery shown in circuit (FIG. 20) to close and actuate the magnetic solenoid $S_n$ and $S_{20}$ whereby the lap supplying unit 203 runs and supplies a lap to the corresponding delivery making the "demand".

FIG. 20 showing the circuit is a diagram in explanation of a fundamental principle and many of the specific parts are omitted. The locations of the switch $SW_n$ and solenoid, etc. are not shown in FIG. 15. Further, the switch 212 of FIG. 15 is in a circuit different from that shown in FIG. 20, and so it is not shown in FIG. 20. Such omitted parts are clearly explained in other parts of the specification.

The automatic lap supply unit 203 which is equipped with a lap saddle 231 for supply use, when not loaded with a lap, is at all times stopped right below the path of the lap carrier at the end of the comber where it stands ready to receive a lap from the carrier. In this case, when the unit is stationed at 203', a normally closed microswitch 216 is pressed by a projection 215 provided at the extremity of the rails 202 thereby opening the circuit of the motor 200 and thus keeping the unit stopped in this position. The front part 231' of lap saddle 231 is only slightly higher than the bottom part of the saddle, i.e., it is such that the bottom edge of the lap being conveyed by the lap carrier is not touched thereby. On the other hand, the rear part 231'' is higher than the bottom edge of the lap being conveyed, with the consequence that it is adapted to obstruct the advance of the lap being conveyed and activate release means on 106 to deposit the same onto the saddle in a state wherein the tail end of lap 170 hangs past the front of the front part 231' of the saddle.

As seen in FIG. 21, saddle support 281 on the underside of saddle 231 is provided with a spring 282, which upon being pressed by the weight of the lap closes a normally opened microswitch 217 in a circuit in parallel to the circuit in which microswitch 216 is located. Unit 203 has a projection 218 seen in FIG. 17 on its underside to which projection are juxtaposed microswitches 220 and 222—a portion of projection 218 being broken away in FIG. 17 in order that microswitch 220 hidden by microswitch 222 in FIGS. 16 and 18 may be seen. At position 203'' of FIGURE 14, adjacent the first comber head to which a lap may be supplied, a projection 219 capable of up-and-down movements and solenoid actuated as explained hereinafter, as indicated by reference numeral 219', is provided, which is so adapted to hit the aforementioned projection 218 when 219 rises to prevent the advance of the unit in the D direction but also contacts normally closed microswitch 220 and functions to open the circuit to the motor 200. On the other hand, when it descends under the influence of the solenoid, it does not obstruct the advance in the D direction of the unit. At positions 203''' of FIGURE 14 adjacent other comber heads, and position 203'', of the first comber head, a projection 221 is provided which is capable of ascending (221') and descending movements and is operated in a manner similar to the projection 219 by solenoids to be described in more detail hereinafter. When said projection 221 ascends, it not only hits the projection 218 to prevent the advance of the unit in the D direction but also contacts normally open microswitch 222 to close the switch circuit whereby solenoid $S_{11}$ is magnetized. The unit is such that it can be made to move on the rails 202 in either the D or D' direction by means of reversible motor 200 the course which reverses at lap supplying position from its advancing movement on the rails to a movement of the mechanism for supplying the lap. When the unit is advanced in the D direction, the end 223' of rod 223 shown in FIG. 19 is pressed inwards towards the E direction against spring 225 by means of the projection 215. As a result, stopper 227 drops into recess 223'' and projection 224 separates from normally open microswitch 229 to close the microswitch, whereby solenoid $S_{12}$ is magnetized. The clutch means (not shown) mentioned hereinabove is interposed in the connection between the motor 200 and the unit 203 and is engaged in any conventional manner for moving the unit 203 in the direction D when solenoid $S_{12}$ is energized. On the other hand, when stopper 227 is slipped out of recess 223'' in a manner to be described hereinafter and the end 223' of rod 23 returns in the E' direction by means of the recovery of the spring 225 to its original state, microswitch 229 and projection 224 by coming in contact open the microswitch circuit and consequently solenoid $S_{12}$ is demagnetized and the clutch set for advance in the opposite direction D'. As a result, the direction of rotation transmitted to the wheels from motor 200 is in the opposite direction and unit 203 returns to the D' direction.

Referring again to FIG. 21, saddle 231 of the unit is pivotally hinged by pin 232 at its front end 231' to saddle support 281 provided on top of frame 265. Further, there is provided a push rod 234 pivotally attached by pin 237 to the tip of a crank 238 which rotates in a fixed direction F about pivot 239—on actuation in responses to a supply order from a comber in a manner to be explained in more detail hereinafter, this push rod passes through a sliding guide 235 pivoted at 236 at a fixed location on the upper edge of the frame whereby the top of the pushing-up rod carrying roller 233 abuts against the underside of saddle 231. Thus, the saddle is pushed so as to rotate in a sectoral fashion about the pivot 232, with the consequence that the rear part 231'' is pushed upwardly. Arm 241 which rotates sectorally about fulcrum 242 is equipped at its distal end with a press bar 240. Further, arm 241 is pivoted by pin 243 with a connecting rod 244 which, in turn, is pivoted by pin 245 to a crank 246 which rotates in a fixed direction H about pivot 247. Connecting rod 244 is capable of extension and contraction by virtue of a spring provided therein. A nipper comprises a top nipper knife 248 and a bottom nipper knife 249, the side arms being disposed on both sides and pivoted at a common shaft 250. Further, to the rear end of the side arm of the top nipper knife there is pivoted a pin 251 and one end of a connecting rod 252 which, in turn, is pivoted with pin 253 to the distal end of a crank 254 which rotates in the direction K about a shaft 255. The rear end of the side arm of the bottom nipper knife 249 is biased by means of a spring 259 affixed to the frame 265. The movement of the arm is however limited by means of a stopper 263 so that it cannot open beyond a given point. The common fulcrum 250 of the nippers also functions as the pivot of arm 256 which rotates sectorally about fulcrum 242. Arm 256, on the other hand, has a projection whose tip 257 is always in intimate contact with a cam 258 by means of the pulling force of spring 259. Hence, concomitantly as said cam turns in the M direction, the fulcrum 250 of the nippers rotates sectorally. Further, a stroke plate 260 is provided at the distal end of top nipper knife 248 on that side opposite to that of knife 248.

FIG. 20 shows the electric circuit for automatically carrying out the movement of the lap feeder. The rail lines 202, 202' which are connected to an electric source (not shown) have the motor 200 across the lines connected in series with microswitches 216, 217, which are in parallel, and another microswitch 220; and solenoids $S_{11}$, $S_{12}$ and $S_{13}$ all in series with microswitches 222, 229 and 264, respectively, all of which are in parallel with the motor 200. The electric source is operatively connected by the rail lines 202, 202' which are conductively associated with the unit 203 by conventional contacts to energize the motor 200. The solenoids are used to operate the clutches, $S_{11}$ being used to operate a clutch for changing the rotation of the motor to an action for moving the unit or for supplying the lap, i.e., to a rotation of crank 238, $S_{12}$ being that for operating the clutch to change the direction of travel of the unit, as hereinbefore described; and $S_{13}$ being used to engage the clutch for rotating crankshafts 247 and 255 and camshaft 258. These parts and circuits, including the motor, are all provided within the unit. One such switch 212 being shown illustratively in FIG. 15. This switch is supported in any desired manner beneath the ends of the spool 36 so as to be closed when the spool engages the same, which only occurs when the lap 35A is substantially empty. The function of these switches will be pointed out in more detail hereinafter. On the other hand, normally open microswitches $sw_1$, $sw_2$ and up to $sw_n$, are provided for each head of the comber for detaching the point at which the lap is to be supplied to the several heads of the comber and solenoids $S_1$, $S_2$ and up to $S_n$ are operatively connected to the projections 221 of the several heads, the foregoing microswitches and solenoids being respectively in sets, as illustrated, and conected in parallel, which then pass through solenoid $s_{20}$ to be connected tot he line. Switches $sw_1$, $sw_2$, etc., and solenoids $s_1$, $s_2$, etc., are enclosed in the comber equipment 207. Solenoid $s_{20}$ is the solenoid which operates the projection 219 for causing the unit 203 which has received the lap 35 to stand by at 203'' and it has a microswitch enclosed therein for its operation. Namely, when all of the microswitches $sw_1$, $sw_2$ and up to $sw_n$ are open, it functions to the projection 219 is in the normally raised position and when any one of the circuits is closed, which occurs when any comber heads needs an additional lap supply projection 219 is caused to lower to the position indicated by 219' and the projection 221 associated with the particular head is raised by energization of its respective solenoid.

When the lap carrier 106 carries a lap, and when unit 203 is empty and is at the lap receiving position 203', the bottom of the lap hits the rear part 231'' of the saddle thereby releasing and unloading the lap onto the saddle as the carrier passes above the lap saddle. Saddle 231 descends under the weight of the lap countering spring 282 to close switch 217. As a result, motor 200 starts up and moves the unit towards the D direction. As projection 219 is normally in its raised position, projection 218 hits projection 219 and stops. Simultaneously, microswitch 220 hits the upper end of projection 219 to open the motor circuit. Hence, the unit stands by at this position 203'' awaiting order for supplying the lap. If the unit stands by at position 203'', the lap carrier can advance along the carrier route. Thus, it is not hindered in its movement and can carry a lap to another unit standing by at another comber. When one of the comber heads approaches completion of processing of a supply of lap one of the microswitches $sw_1$, $sw_2$, etc., is activated. This is effected by engagement of the spool 36 with the microswitch 212 as explained hereinabove. When a lap supply order is received from the comber head, the activation of one of the microswitches $sw_1$, $sw_2$, etc., functions to energize the corresponding solenoids $s_1$, $s_2$, etc., as well as solenoid $s_{20}$ with the consequence that projection 219 descends to 219' while a particular projection 221 ascends to 221'. As a result, the unit moves in the D direction and is stopped by projection 218 hitting the raised projection 221' at 203''', the position at which the lap is to be supplied. At this time, since projection 221' is pressed against microswitch 222 juxtaposed on projection 218 with microswitch 220, microswitch 222 is activated. As a result, since by means of solenoid $s_{11}$ the clutch transmits the rotation of the motor 200 to shaft 239, crank 238 is rotated. As shown in FIG. 19, stopper 227 which has slipped into recess 223'' of the rod has its one end 227'' pressed downwardly into the recessed part with fulcrum 226 as its axis by means of spring 228 the one end of which is secured to the frame 265. Hence, since the other end 227' of the stopper is pressed downwardly by the rotation of crank 38 immediately prior to its completion of one rotation, the stopper 227 slips out of recess 223'', with the consequence that with rod 223 returning towards the E' direction by the reversional action of spring 225 projection 224 is pressed against microswitch 229 to activate solenoid $s_{12}$ and thus change the first mentioned clutch to cause the unit to move towards its reversional direction D'. As a result of the rotation of crank 238 in the F direction, the lap saddle, as shown in FIG. 22, is pushed up by means of connection rod 234 with 232 as a fulcrum and is inclined so as to discharge lap 35' in the G direction onto the feeding device 261 of the comber.

Thus the series set up of combing processes has many distinctive features when compared with the conventional combing process. Namely, by improving the doffer wire of the carding engine the collecting power of the doffer and the fiber arrangement of the delivered sliver have been improved and hence it has been made possible to reduce the delivery speed of the carding engine to a maximum degree thereby producing carded sliver of heavy weight without lowering the production or the quality of the product.

As a result, not only is the operation of the subsequent drawing and lapping machine and process facilitated, but also the number of carding engines that are required to be operated by being connected with a single drawing and lapping machine can be reduced to such an extent as to be readily controlled, whereby the operation and production of comber lap can be effectively carried out.

The drawing and lapping machine can produce by a single process good quality comber lap by drafting in a most effective method, as already described hereinbefore, the carded silver produced by a carding engine and is conveyed to the drawing and lapping machine via sliver conveying apparatus, and this constitutes an essential part of this invention. And this is most effective in reducing production costs by reducing the number of processing steps as well as by improving the yield.

Further, since an automatic doffing apparatus for the full lap is built into this drawing and lapping machine, the doffing of the lap can be carried out completely automatically without stopping the operation of the machine. Hence, this contributes to a still further increase in the productivity of this machine. In addition, since the full lap which has been doffed is transported automatically by means of an automatic lap transporting apparatus, then delivered to the combing process, the next following processing step, by means of the hereinbefore mentioned automatic carrying apparatus, such as an overhead carrier, and an automatic lap supplying apparatus, after which the lap is supplied to the comber by means of the automatic lap supplying apparatus, these apparatuses are effective in reducing the labor cost required conventionally in treating and carrying the comber lap.

The comber lap doubling and drawing apparatus located in the comber immediately prior to the point at which the lap is fed to the nipper, further enhances the fiber uniformity and arrangement of the comber lap of good quality produced by the drawing and lapping machine and thus performs an important role in improving the yield. Furthermore, since conventional combers are not provided with such an apparatus, even though a comber lap of highly superior fiber arrangement were to be fed to the comber in an attempt to obtain comparable effects, excessive licking would occur so as to result in much difficulty in carrying out its processing. Additionally, there was also a tendency to reduce the combing effect because of having the improved fiber arrangement. In this respect, the said doubling and drawing apparatus can feed laps of high fiber arraangement to a nipper without ever causing licking. Further, the postdrawing apparatus equipped with an automatic unevenness regulator, which apparatus is to be appended to a combination of a plurality of combers, also brings about a reduction in the number of processing steps and is highly effective from the standpoint of producing uniformly good quality slivers that can be applied to a roving frame or directly to a ring spinning frame.

We claim:

1. An apparatus for automatically conveying laps from a carding machine to a drawing and lapping machine thence to a doffing apparatus and thence to a group of combers comprising in combination a plurality of carding machines each having a doffer adjacent its periphery in juxtaposed relation, said doffer provided with a metallic wire having a scoop angle of 20–40°, a pocket area of 3–4 mm.$^2$ and from 200–250 points per inch $^2$, said doffer being provided with rotating shaft means for moving it at a relatively slow surface speed, transferring means disposed adjacent the output side of said carding machines for transferring a plurality of carded slivers from said carding machines to a drawing and lapping machine at the rate of production of said slivers, said drawing and lapping machine adapted to receive a plurality of carded slivers and form fleeces which fleeces are condensed and wound in a lap, an automatic doffing apparatus disposed adjacent the output side of said drawing and lapping machine to receive said laps, a lap receiving apparatus disposed on the output side of said automatic doffing apparatus and movable horizontally and transversely to the lap doffer direction, said lap receiving apparatus having lap carrying cradle plates detachably mounted thereon, a lap lifting apparatus disposed on the opposite side of the lap receiving apparatus from said automatic doffing apparatus and including means to lift the cradle plates of said lap receiving apparatus, an endless overhead rail disposed in a closed loop passing above said lifting apparatus and thence along and on the intake side and above a gang of combers, a plurality of lap carriers hung from and movable along said overhead rail at intervals and each having means to grasp and release a lap, carrier driving means for driving said carriers along said rail, means actuated by a carrier without a lap therein approaching the point above the lifting apparatus for raising the cradle plate lifting means, means for actuating said lap carrier to grasp a lap on a lifted cradle plate and means to release the lap from said carrier in response to the presence of an empty comber feeding unit, said comber feeding unit comprising a pivotal lap saddle movable transversely along rails from the point of receiving said lap from said carrier to the input of a comber, means to control the travel of said saddle in response to a signal indicating that a comber requires a lap.

2. The apparatus of claim 1 wherein each comber has associated with its input an inclined, endless, rotatable belt receiving a lap from said lap saddle, means to hold an empty spool and a full spool, means to rotate said belt upon receipt of a lap and to release an empty spool.

References Cited

UNITED STATES PATENTS

| 2,037,348 | 4/1936 | Stein | 242—55.1 |
| 2,115,605 | 4/1938 | Allen et al. | 19—112 XR |
| 2,713,701 | 7/1955 | Wildbolz et al. | 19—157 |
| 2,832,098 | 4/1958 | Mee | 19—112 XR |
| 3,063,101 | 11/1962 | Andreani | 19—243 |

FOREIGN PATENTS

| 858,326 | 5/1940 | France. |
| 890,150 | 10/1943 | France. |
| 3,874 | 1879 | Great Britain. |
| 369,336 | 3/1932 | Great Britain. |
| 886,396 | 1/1962 | Great Britain. |

DORSEY NEWTON, *Primary Examiner.*

U.S. Cl. X.R.

19—115, 243